United States Patent [19]

Reinsma et al.

[11] E Re. 29,718

[45] Reissued Aug. 1, 1978

[54] RESILIENT MID-PITCH LUG FOR AN ENDLESS TRACK

[75] Inventors: Harold L. Reinsma, Dunlap; Frederick D. Proksch, Peoria, both of Ill.

[73] Assignee: Caterpillar Tractor Co., Peoria, Ill.

[21] Appl. No.: 801,716

[22] Filed: May 31, 1977

Related U.S. Patent Documents

Reissue of:

[64] Patent No.: 3,887,244
Issued: Jun. 3, 1975
Appl. No.: 420,720
Filed: Nov. 30, 1973

[51] Int. Cl.[2] ..... B62D 55/08
[52] U.S. Cl. ..... 305/57
[58] Field of Search ..... 305/57, 35 R, 54, 53, 305/36, 37, 38; 74/216.5, 245 R, 245 C, 247

[56] References Cited

U.S. PATENT DOCUMENTS

| | | | |
|---|---|---|---|
| 1,513,459 | 10/1924 | Jett | 305/57 X |
| 3,486,574 | 12/1969 | Baron | 180/9.62 |
| 3,563,614 | 2/1971 | Parks | 305/57 X |
| 3,567,294 | 3/1971 | Simpson et al. | 305/57 |
| 3,680,929 | 8/1972 | Hnilicka et al. | 350/57 |

*Primary Examiner*—Robert B. Reeves
*Assistant Examiner*—John P. Shannon
*Attorney, Agent, or Firm*—Robert E. Muir

[57] ABSTRACT

An endless track assembly for use with a track-type vehicle having a notched drive sprocket is provided with link elements having a resilient mid-pitch impact lug located midway between the track link bushings. The resilient mid-pitch lug reduces track noise and wear due to metal-to-metal impact of the track against the sprocket and idler by having a topmost portion of greater height than adjacent bushings whereby initial contact is made by the lug so that impact energy is thereby absorbed prior to engagement of the track bushings.

3 Claims, 3 Drawing Figures

RESILIENT MID-PITCH LUG FOR AN ENDLESS TRACK

Matter enclosed in heavy brackets [ ] appears in the original patent but forms no part of this reissue specification; matter printed in italics indicates the additions made by reissue.

*CROSS-REFERENCE:*

*This is a reissue in division for purposes of conversion of U.S. Letters Patent No. 3,887,244, granted on Jun. 3, 1975.*

BACKGROUND OF THE INVENTION

This invention relates to track assemblies for track-type vehicles. In particular, this invention relates to an improved impact lug for such assemblies which minimizes metal-to-metal contact between the track and frame elements thereof during operation of the vehicle, and imparts improved wear and operating characteristics to the assembly.

Conventional endless tracks for use with track-type vehicles such as crawler tractors comprise a series of track links interconnected by pins fitted with an external bushing. In such a construction, the track links have an inner rail surface upon which the track rollers and idler wheels roll. The pin and bushing connections of these conventional prior art structures provide a drive means for coaction with a chain-driving sprocket whereby the track is forcibly driven by rotational movement of the sprocket.

Although such a track construction has gained wide acceptance, it is subject to several shortcomings, such as noise created by the bushings impacting upon the drive sprocket, and the rail surfaces impacting on the idler. Such conventional structures are also subjected to a high rate of wear and power losses due to these impactions and due also to the scrubbing action of the bushings against the sprocket as the track is driven.

A recent development in the art of endless tracks for track-type vehicles is the provision of a drive lug located on the track shoes intermediate the pin and bushing connections to assist the bushings in driving the track. Although these mid-pitch drive lugs have been somewhat effective in substantially eliminating a number of the disadvantages associated with conventional endless tracks, other disadvantages, such as high noise and wear levels, have not been satisfactorily overcome. Exemplary of prior art attempts to reduce noise, wear and other shortcomings of endless track assemblies include the mid-pitch drive lugs described in U.S. Pat. Nos. 3,563,614; 3,567,294; and 3,680,929; the cushioned assembly and related components described in U.S. Pat. Nos. 2,338,817 and 3,504,562; and the miscellaneous improvements described in U.S. Pat. Nos. 3,486,574 and 3,504,951.

Cross reference is made to U.S. application Ser. No. 416,828, to Boggs et al. filed Nov. 19, 1973, *now U.S. Pat. No. 3,889,550* which illustrates another solution to solve the problem.

Typically, these and other endless track assemblies presently in use fail to meet the stringent noise limitations for track-type vehicles imposed by Federal legislation.

SUMMARY AND OBJECTS OF THE INVENTION

Accordingly, the present invention provides an improved impact lug for an endless track assembly comprising a resilient mid-pitch lug which minimizes metal-to-metal impact between the track and the idler and sprocket of a track-type vehicle. The resilient lug minimizes the customary impact through the absorption of impact energy by deflection of the resilient lugs prior to engagement of the track with the sprocket and idler.

The minimization of such metal-to-metal impact by the resilient impact lug concurrently reduces noise associated with operation of the vehicle, and increases the wear life of the related track assembly components. Alternate embodiments of the invention include resilient drive lugs having improved wear life, lower manufacturing costs, improved mounting means, sprocket-cleaning means, higher resiliency quotients for use with relatively larger vehicles, and alternate means for improved noise reduction.

It is therefore an object of the invention to provide an improved track assembly for track-type vehicles which minimizes vehicle noise production during operation and improves the wear life of assembly components.

It is another object of this invention to provide a resilient mid-pitch impact lug for endless track assemblies for track-type vehicles which reduce track noise and wear resulting from customary metal-to-metal impact of the track against the sprocket and idler.

It is another object of this invention to provide a resilient mid-pitch impact lug for endless track assemblies having relatively high wear resistance and relatively low manufacturing costs.

It is an additional object of this invention to provide a resilient mid-pitch impact lug for endless track assemblies having improved means for mounting the lug on the track assembly.

[It is a further object of this invention to provide a resilient mid-pitch impact lug having a sprocket cleaning means.]

It is a further object of this invention to provide a resilient mid-pitch impact lug for endless track assemblies having increased resiliency for use in conjunction with relatively large track-type vehicles.

[It is yet a further object of this invention to provide a resilient mid-pitch impact lug for endless track assemblies which reduces track noise resulting from metal-to-metal impact of track elements during back flexing of the track.]

Other objects and advantages of the invention will be apparent from the following description and claims and the accompanying drawings which, by way of illustration, show *a* preferred [embodiments] *embodiment* of the present invention and the principles thereof and what [are] *is* now considered to be the best [modes] *mode* of applying these principles. Other embodiments of the invention embodying the same or equivalent principles may be used, and structural changes may be made as desired by those skilled in the art without departing from the scope of the present invention or the purview of the appended claims.

BRIEF DESCRIPTION OF THE DRAWINGS

[FIG. 4 is a fragmentary side elevation view in partial cross section of the track assembly of FIG. 1 illustrating in detail the resilient impact lug of this invention; and]

[FIGS. 5–8 illustrate in detail alternate embodiments of the invention in partial cross section.]

DETAILED DESCRIPTION

Figure 1:
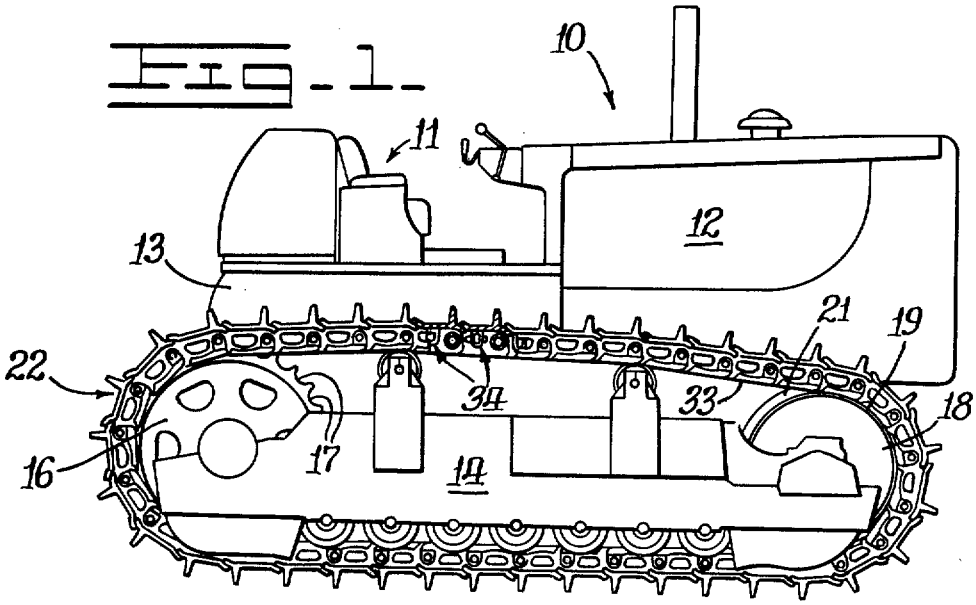
FIG. 1 is a side elevation view of a track-type vehicle including a track assembly incorporating a preferred embodiment of the resilient impact lug of this invention.
Figure 2:
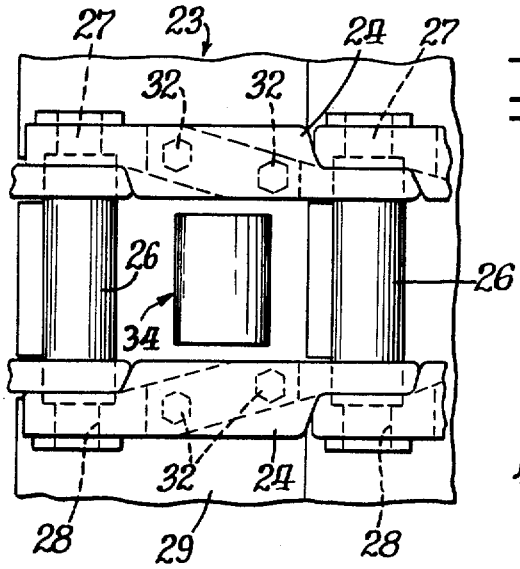
FIG. 2 is a fragmentary top plan view of the track assembly of FIG. 1; *and*
Figure 3:
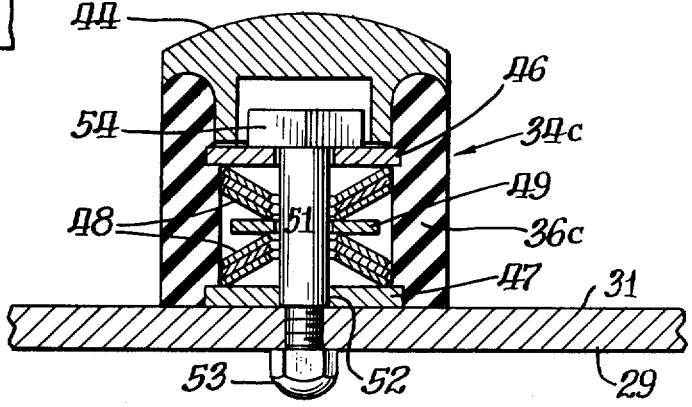
FIG. 3 is a [fragmentary front elevation view in partial cross section of the track assembly taken along the lines III—III of FIG. 2;] *cross section of the resilient impact lug.*

With particular reference to FIGS. 1 [through 5] *and 2*, a track-type vehicle such as a crawler tractor generally indicated at 10 is illustrated, conventionally including an operator station shown generally at 11 and an engine 12 mounted on a main frame [14] *13*. The main frame 13 is supported by a pair of laterally spaced track roller frames, one of which is shown at 14. Each of the track roller frames 14 includes a drive sprocket 16 having a plurality of notches 17 formed therearound, and an idler wheel 18 having a rim 19 with a raised center portion 21. An endless track 22 is rotatably mounted around the sprocket 16 and the idler 18 for driving the tractor 10. The endless track 22 is constructed from a plurality of articulately connected track link assemblies, one of which is generally indicated at 23 [(FIGS. 2 and 3)] *(FIG. 2)*. The track link assembly 23 includes a pair of links 24 which are retained in spaced relationship by a pair of track bushings 26 fitted about the other diameter of a pair of track pins 27, which are received in a pair of bores 28 of the track links 24. A track shoe 29 having an inner surface 31 toward the links 24 is secured to each of the links by a plurality of fasteners such as bolts 32. [As best shown in FIG. 3, the] *The* track links 24 include an inner rail surface 33 upon which the track wheels, such as the idler 18, are adapted to roll. The endless track 22 is driven by the engagement of the bushings 26 with the sprocket 16. As will be recognized, the foregoing is representative of a conventional track-type vehicle provided with an endless track assembly.

The conventional track assembly described above is shown provided with the preferred resilient mid-pitch impact lug of this invention, generally indicated at 34. As best shown in FIG. 2, the lug 34 is disposed at a central location midway between each of the bushings 26[,]. [and, as best shown in FIGS. 3 and 4, includes a generally tubular body 36 of an elastomeric material. In the preferred embodiment of the invention illustrated in FIGS. 1–4, the elastomeric material is preferably a synthetic plastic having a hardness substantially greater than natural rubber, e.g. polyurethane, for better wear- and abrasion-resistance of the lug 34. Also, in the preferred embodiment, the generally tubular body 36 is hollow, reducing the amount of material necessary to form the lug 34, thereby reducing the manufacturing costs thereof. Advantageously, a fabric or metal, for example steel, reinforcing ply 37 may be circumferentially imbedded in the body 36 for additional strength, or other reinforcing means may be used.]

[The lug 34 may be formed by conventional means. For example, the lug 34 reinforced by the ply 37 may be formed by extruding the material and subsequently cutting it to the proper dimensions. Alternatively, if the ply 37 is not used, the body 36 may be formed by injection molding, a preferred method for minimizing manufacturing costs.]

[The lug 34 is attached to the inner surface 31 of the track shoe 29 by fastening means such as a pair of bolts 38, as shown in FIG. 3. The bolts 38 are disposed through the shoe 29 and the wall of the tubular body 36, and threadably engage a mounting strip 39. A pair of cylindrical spacers 40 are preferably disposed around the bolts 38 so that a sufficient torque may be applied to the bolts to prevent loosening during operations of the vehicle, while avoiding the exertion of undue compressive force on the lug 34. As shown in FIG. 4, a shim 41 may be placed under each lug 34 after a predetermined amount of wear has occurred in the lug, to extend to useful life.]

[In the alternate embodiment of the invention shown in FIG. 5, a resilient drive lug 34a comprises a natural rubber body 36a. Since the natural rubber is softer than the synthetic plastic material comprising the lug 34, the body 36a is solid rather than hollow to provide it with a comparable resiliency or spring rate. The body 36a also includes a mounting strip 39a bonded thereto, which is threadably engaged by the mounting bolts 38. A particular advantage of the lug 34a is that, in the event the track 22 jumps the sprocket 16, the natural rubber body 36a is sufficiently flexible to be deflected sideways with little or no injurious effects.]

[In the alternate embodiment shown in FIG. 6, a resilient drive lug 34b includes a solid, natural rubber body 36b having a wedge-shaped tapered end 42. The tapered end 42 forces mud or other accumulations from the sprocket notches 17 during operation of the vehicle to prevent the mud from building up therein. Preferably, a hard tip 43 of steel or other wear-resistant material is bonded or otherwise secured to the tapered end 42 to provide increased wear resistance of the lug 34b.]

In the embodiment illustrated in FIG. [7] *3*, a resilient lug 34c includes a hollow tubular body 36c having cap means 44 disposed over one of the open ends thereof and bonded thereto for imparting increased wear-resistance to the body 36c. The material comprising the cap means 44 has sufficiently high wear resistant qualities to increase the wear life of the lug 34c, while at the same time being sufficiently low in mass to avoid having an appreciably detrimental effect on the noise abating qualities of the lug. Steel cap means of low mass may be advantageously used.

The resilient lug of this invention may be used in conjunction with additional spring means as illustrated in FIG. [7] *3* to provide a lug having a greater spring rate, for use for example in conjunction with relatively large vehicles. As shown, a pair of spaced pressure plates 46 and 47 are disposed within the hollow body 34c, and secured thereto, as by bonding. Spring means comprising two stacks of opposing Belleville spring washers 48, separated by a spacer 49, are disposed between the pressure plates 46 and 47. A hold-down bolt 51 having a shoulder 52 to limit compression of the lug 34c cooperates with a nut 53 to secure the lug to the track shoe 29. The bolt 51 is provided with an enlarged head 54 which engages the pressure plate 46 for preloading the washers 48.

[In the alternate embodiment illustrated in FIG. 8, a resilient impact lug 34d includes a solid rubber body 36d, and a pair of lateral protrusions 56 extending laterally from the opposite sides thereof. One of the protrusions 56 is disposed adjacent an underlying edge 57 of the adjoining track shoe 29a to provide a cushion between the adjacent track shoes 29 and 29a, and the track shoe 29a and the corresponding track link 24a to reduce metal-to-metal contact customarily encountered between grouser 58 and the shoe 29 during back-flexing of the track assembly 22. Although one protrusion 56 is sufficient for this purpose, two are preferably provided to make the lug 34d reversible and thereby extend its useful life.]

In operation, as the track assembly 22 advances around the track roller frame 14, each of the individual link sections 24 successively comes into engagement with the idler 18 and the sprocket 16. On conventional track structures, the initial contact of such engagement is accompanied by a severe impact between the bushings 26 at the sprocket and the rail surfaces 33 at the idler. However, with the present track structure employing the resilient lug 34, which is dimensioned to be of greater height from the track shoe inner surface 31 than the topmost portion of the adjacent bushings 26, such initial contact is made by the lug, as in the notches 17 of the sprocket and the raised center portion 21 of the idler, so that the impact energy is absorbed by the lugs prior to the metal-to-metal engagement of the track with the idler and sprocket. Therefore, the noise and wear associated with such metal-to-metal impact is greatly reduced.

As the track is driven clockwise around the sprocket, [as best shown in FIG. 4,] the driving tension in each track link section 23 becomes successively less, which permits the energy stored in the lugs 34 to progressively lift the bushings 26 out of engagement with the sprocket notches 17 to eliminate the scrubbing which normally occurs therebetween as the track chain leaves at the top of the sprocket. Thus, the lug 34 eliminates another major source of wear of the bushings 26 and the sprocket notches 17.

[Still another source of track noise is produced from the metal-to-metal impact between adjoining track shoes, which occurs when the track is back-flexed, as when the track runs over a rock or other similar object. The noise produced by such back-bending is reduced by the utilization of the protrusions 56 provided on the lug 34d shown in FIG. 8, which contacts the underlying edge 57 of the adjacent track shoe prior to the metal-to-metal contact of the edge of one track shoe with the grouser 58 of the following track shoe. Therefore, the noise is reduced in a manner similar to the way in which the main body 36d reduces the noise between the track and the idler and sprocket, as described earlier, by the absorption of the impact energy the the lug. The protrusions 56 are provided on both sides of the lug 34d to make the lug reversible.]

Although the invention has been hereinbefore described and illustrated in the accompanying drawings with respect to *a* specific [embodiments] *embodiment*, various modifications and changes may be made therein without departing from the true spirit and scope of the invention, and thus it is not intended to limit the invention except by the terms of the appended claims.

What is claimed is:

[1. In an endless track assembly of the type used on a vehicle provided with a drive sprocket having teeth and notches alternately disposed about the circumference of the sprocket, said track assembly comprising a pair of laterally unstanding link elements; parallel pin and bushing elements secured to and interconnecting respectively opposite ends of the links; a track shoe secured to the bottoms of said links; the improvement comprising a resilient impact lug reinforced by reinforcing means including a wear resistant material secured to the contact end of said impact lug, said lug being releasably secured to the shoe midway between the bushing elements, said impact lug having a topmost portion of greater height from the track shoe than the topmost portion of the adjacent bushings whereby initial contact is made by said lug so that impact energy is absorbed by the lug prior to engagement of an adjacent bushing.]

[2. The invention of claim 1 wherein the impact lug comprises a solid body of natural rubber.]

[3. The invention of claim 2, wherein said solid body further includes at least one protrusion extending laterally therefrom and adapted to underlie the edge of an adjacent track shoe.]

[4. The invention of claim 2, wherein said solid body is provided with a tapered contact end.]

[5. The invention of claim 4, wherein said tapered contact end is provided with a metal tip.]

[6. In an endless track assembly of the type used on a vehicle provided with a drive sprocket having teeth and notches alternately disposed about the circumference of the sprocket, said track assembly comprising a pair of laterally upstanding link elements; parallel pin and bushing elements secured to and interconnecting respectively opposite ends of the links; a track shoe secured to the bottoms of said links; the improvement comprising a resilient impact lug in the form of a hollow, generally tubular body of synthetic plastic material substantially harder than natural rubber releasably secured to the shoe midway between the bushing elements, said hollow, generally tubular body being reinforced by reinforcing means including a reinforcement ply imbedded therein, comprising a steel wire reinforcement ply circumferentially imbedded in said hollow, generally tubular body, said impact lug having a topmost portion of greater height from the track shoe than the topmost portion of the adjacent bushings whereby initial contact is made by said lug so that impact energy is absorbed by the lug prior to engagement of an adjacent bushing.]

[7. The invention of claim 6, wherein said reinforcement ply comprises a fabric reinforcement ply circumferentially imbedded in said hollow, generally tubular body.]

[8. The invention of claim 6, wherein the impact lug is secured to the track shoe by at least one bolt threadably engaging the body of said lug between said shoe and a mounting strip.]

9. In an endless track assembly of the type used on a vehicle provided with a drive sprocket having teeth and notches alternately disposed about the circumference of the sprocket, said track assembly comprising a pair of laterally upstanding link elements; [parrallel] *parallel* pin and bushing elements secured to and interconnecting respectively opposite ends of the links; a track shoe secured to the bottoms of said links; the improvement comprising a resilient impact lug in the form of a hollow, generally tubular body of synthetic plastic material substantially harder than natural rubber releasably secured to the shoe midway between the bushing elements, said tubular body being provided with capping means at the contact end thereof and contains therewithin spring means biased between a pair of pressure plates secured within the body at opposite ends thereof, said impact lug having a topmost portion *of greater height from the track shoe than the topmost portion* of the adjacent bushings whereby initial contact is made by said lugs so that impact energy is absorbed by the lug prior to engagement of an adjacent bushing.

10. The invention of claim 9, wherein said capping means comprises a steel cap.

11. The invention of claim 10, wherein said spring means comprises a plurality of Belleville washers.

* * * * *